(12) United States Patent
Abrahamson

(10) Patent No.: US 10,166,813 B2
(45) Date of Patent: Jan. 1, 2019

(54) AXLE WHEEL END AXIAL THRUST ASSEMBLY

(71) Applicant: Koyo Bearings North America LLC, Westlake, OH (US)

(72) Inventor: Scott Abrahamson, Piedmont, SC (US)

(73) Assignee: KOYO BEARINGS NORTH AMERICA LLC, Westlake, OH (US)

( * ) Notice: Subject to any disclaimer, the term of this patent is extended or adjusted under 35 U.S.C. 154(b) by 0 days.

(21) Appl. No.: 15/510,645

(22) PCT Filed: Sep. 11, 2015

(86) PCT No.: PCT/US2015/049754
§ 371 (c)(1),
(2) Date: Mar. 10, 2017

(87) PCT Pub. No.: WO2016/040846
PCT Pub. Date: Mar. 17, 2016

(65) Prior Publication Data
US 2017/0190215 A1    Jul. 6, 2017

Related U.S. Application Data

(60) Provisional application No. 62/049,217, filed on Sep. 11, 2014.

(51) Int. Cl.
*B60B 35/14*     (2006.01)
*B60K 17/16*     (2006.01)
(Continued)

(52) U.S. Cl.
CPC .............. *B60B 35/14* (2013.01); *B60B 35/12* (2013.01); *B60B 35/122* (2013.01); *B60B 35/16* (2013.01);
(Continued)

(58) Field of Classification Search
CPC ....... B60B 35/14; B60B 35/16; B60B 35/122; B60B 35/18; B60B 2380/14;
(Continued)

(56) References Cited

U.S. PATENT DOCUMENTS 3,002,769 A    10/1961  Deubler et al.
3,283,843 A    11/1966  Runyan
(Continued)

FOREIGN PATENT DOCUMENTS

| EP | 0754586 A2 | 1/1997 |
|---|---|---|
| WO | 2008/110938 A2 | 9/2008 |
| WO | 2014/074507 A1 | 5/2014 |

OTHER PUBLICATIONS

International Search Report and Written Opinion dated Dec. 8, 2015 for PCT/US2015/049754.

*Primary Examiner* — S. Joseph Morano
*Assistant Examiner* — Jean W Charleston
(74) *Attorney, Agent, or Firm* — Nelson Mullins Riley & Scarborough LLP

(57) ABSTRACT

An axle assembly of a vehicle including a differential assembly, an axle tube extending outwardly from a first side of the differential assembly and defining an axle bore, an axle shaft rotatably received in the first axle tube and defining an annular groove extending radially inwardly from its outer surface, a retaining nut axially fixed to the distal end of the first axle tube, and a snap ring received in the annular groove of the first axle shaft, wherein the snap ring abuts the retaining nut, thereby preventing outward motion of the first axle shaft with respect to the first axle tube.

9 Claims, 6 Drawing Sheets

(51) Int. Cl.
*B60B 35/12* (2006.01)
*B60B 35/18* (2006.01)
*F16C 19/24* (2006.01)
*F16C 33/78* (2006.01)
*B60B 35/16* (2006.01)
*B60B 35/02* (2006.01)

(52) U.S. Cl.
CPC ............ B60B 35/18 (2013.01); B60K 17/165 (2013.01); F16C 19/24 (2013.01); F16C 33/7886 (2013.01); *B60B 35/02* (2013.01); *B60B 2380/14* (2013.01); *B60B 2380/16* (2013.01); *B60B 2380/32* (2013.01); *B60B 2380/71* (2013.01); *B60B 2380/80* (2013.01); *F16C 2326/01* (2013.01)

(58) Field of Classification Search
CPC . B60B 2380/16; B60B 2380/71; F16C 19/24; F16C 33/7886; F16C 2326/01; B60K 17/165

USPC .............................................. 301/124.1, 137
See application file for complete search history.

(56) References Cited

U.S. PATENT DOCUMENTS

| | | |
|---|---|---|
| 3,924,912 A | 12/1975 | Pitner |
| 4,319,789 A | 3/1982 | Irwin |
| 4,382,639 A | 5/1983 | McGuffie |
| 4,386,810 A | 6/1983 | McGuffie et al. |
| 4,469,381 A | 9/1984 | McGuffie |
| 4,533,263 A | 8/1985 | McGuffie |
| 4,690,574 A | 9/1987 | Green |
| 5,062,720 A | 11/1991 | Hall et al. |
| 5,375,934 A | 12/1994 | Hall et al. |
| 6,830,380 B2 | 12/2004 | Kennedy, Jr. |
| 9,593,757 B2 | 3/2017 | Downs et al. |
| 2014/0274544 A1 | 9/2014 | Downs et al. |
| 2014/0339888 A1* | 11/2014 | Downs .................... B60B 35/18 301/137 |

* cited by examiner

AXLE WHEEL END AXIAL THRUST ASSEMBLY

FIELD OF THE INVENTION

The present disclosure relates generally to solid axle assemblies for vehicles and, more specifically, to bearing assemblies that are utilized on the wheel end sections of such solid axle assemblies.

BACKGROUND

Salisbury solid axles are often used in passenger trucks and sport utility vehicles. Salisbury axles are unique in the fact that the axle transmits driving torque to the wheel as well as carries and transmits both radial and axial thrust loads.

As shown in FIG. 1, many existing wheel end bearings 10 for use with solid vehicle axles include an outer cup 11 that is press-fit into the corresponding axle tube 12 to maintain location and define an outer raceway for the corresponding rollers 13. No additional retention features are required for this type of wheel end bearing 10 in that the bearing only handles radial loads. Lubrication for wheel end bearing 10 is provided by the same oil sump that provides lubrication to the differential gears 15 (FIG. 2) that are disposed at the center section of the axle assembly. To maintain lubrication, an oil seal 14 is press-fitted outboard of the wheel end bearing in axle tube 12.

Radial wheel end loads are handled primarily at wheel end bearing 10, whereas axial loads are not. Rather, as best seen in FIGS. 2 through 4, axial loads are transmitted along axle shaft 16. Typically, "C Locks" 18 are utilized to resist outward axial loading and a cross shaft 20 disposed between the opposing axles in a housing 25 of differential 17 absorbs inward axial loading. A typical C Lock includes a heavy annular lock ring 19 received in an annular groove 21 formed on the inboard end of a corresponding axle shaft 16. In the fully assembled configuration (FIG. 3), annular lock ring 19 is further received in an annular recess 23 formed in an end face of a corresponding differential gear 15. During normal operations, inward axial loading has a higher magnitude than outward axial loading due to vehicle dynamics during cornering. When outward axial load on axle shaft 16 occurs, axle shaft 16 attempts to move outwardly from axle tube 12, which causes annular lock ring 19 of the corresponding C Lock 18 to push on the corresponding differential side gear 15. Ultimately, the outward axial load is dispersed through differential carrier bearings 24 to housing 25 of the differential, as shown in FIG. 4.

When inward axial loading is generated from vehicle cornering, an end face 27 of axle shaft 16 thrusts against differential cross shaft 20, as best seen in FIG. 2. In turn, the inward axial loading is transmitted through differential carrier bearings 24, as shown in FIG. 4.

The present invention recognizes and addresses considerations of prior art constructions and methods.

SUMMARY

One embodiment of an axle assembly of a vehicle, includes a differential assembly, a first axle tube extending outwardly from a first side of the differential assembly, the first axle tube including a proximal end adjacent the differential assembly, an opposite distal end, and an axle bore extending therebetween, a first axle shaft rotatably received in the first axle tube, the first axle shaft including a proximal end disposed in the differential assembly, an opposite distal end extending outwardly from the distal end of the first axle shaft, and an annular groove extending radially inwardly from its outer surface, a retaining nut axially fixed to the distal end of the first axle tube, and a snap ring received in the annular groove of the first axle shaft, wherein the snap ring bears against the retaining nut, thereby preventing outward motion of the first axle shaft with respect to the first axle tube.

Another embodiment of an axial thrust assembly for use with an axle assembly of a vehicle having an axle tube and an axle shaft rotatably received therein includes a retaining nut axially fixed to a first end of the axle tube, and a snap ring received in an annular groove defined in an outer surface of the axle shaft, wherein the snap ring bears against the retaining nut, thereby preventing outward motion of the first axle shaft with respect to the first axle tube The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
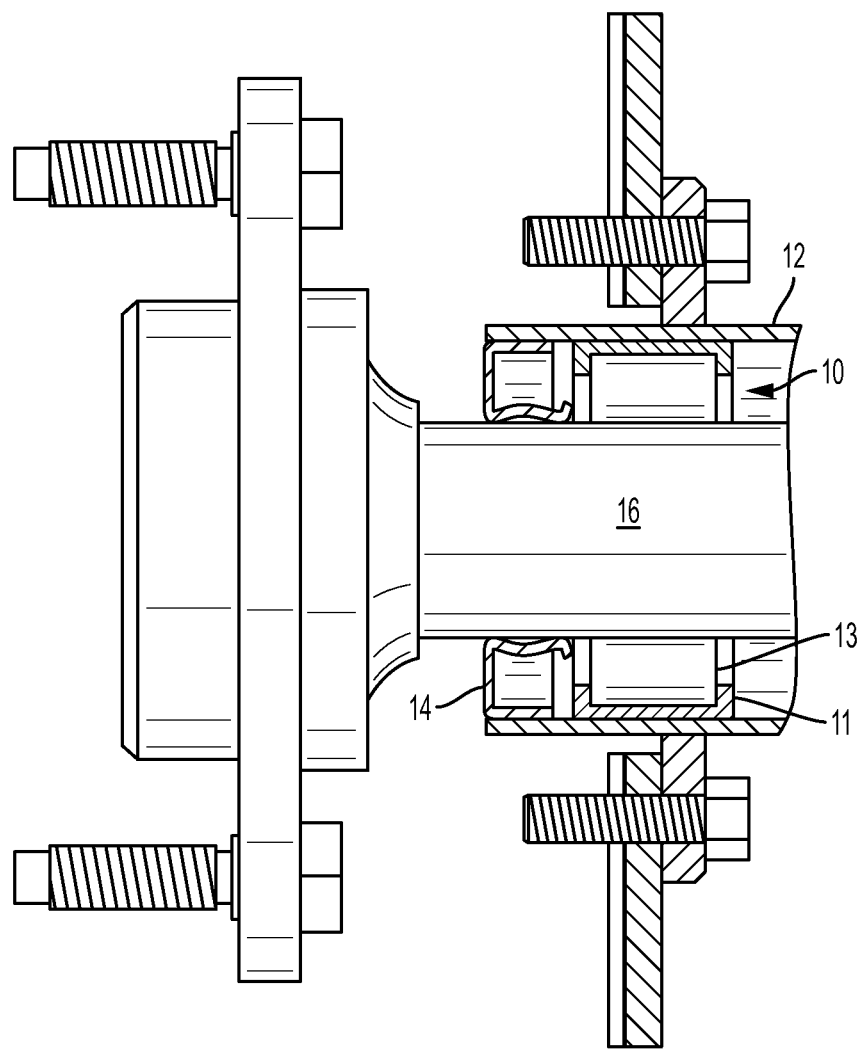
FIG. 1 is a partial cross-sectional view of a wheel end section of a prior art solid axle assembly.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
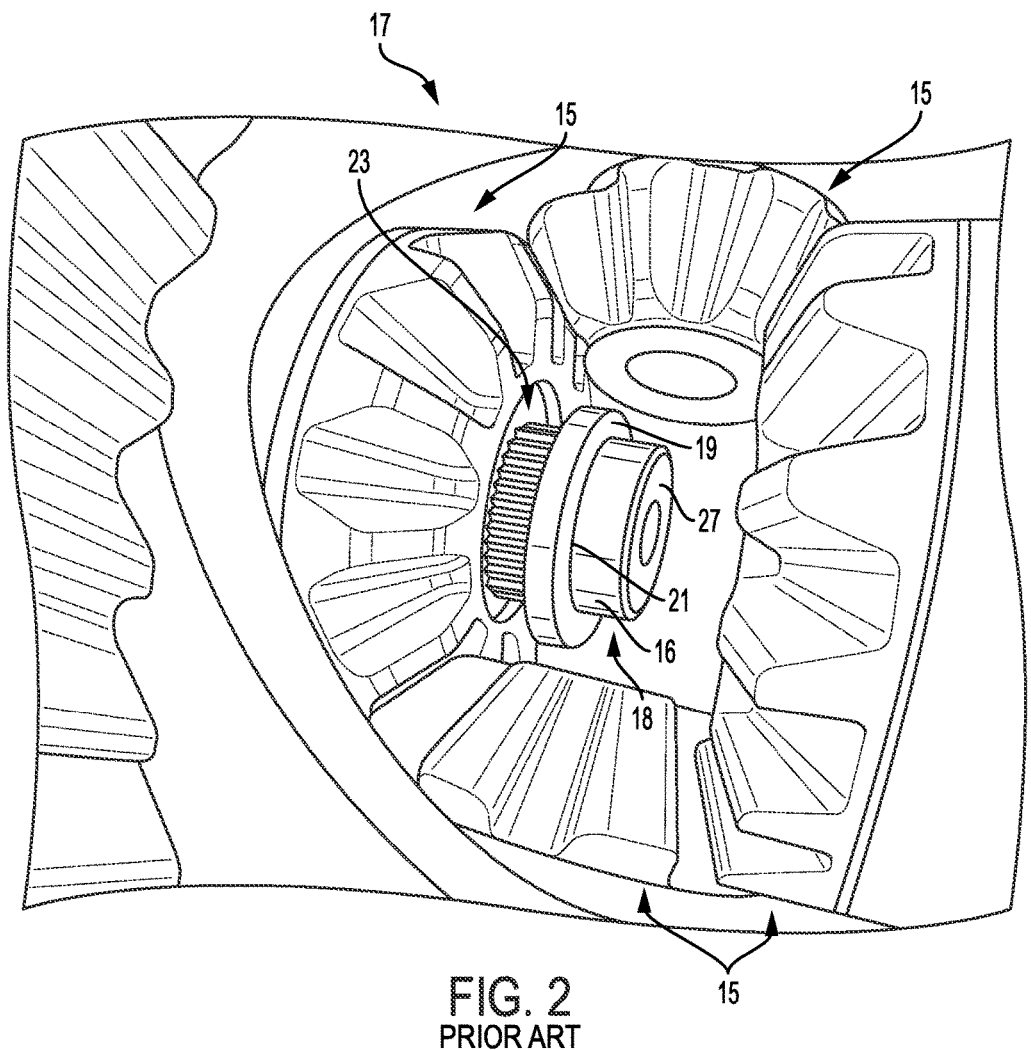
FIG. 2 is a partial perspective view of the prior art axle shaft shown in FIG. 1 and a corresponding differential.
Figure 3:
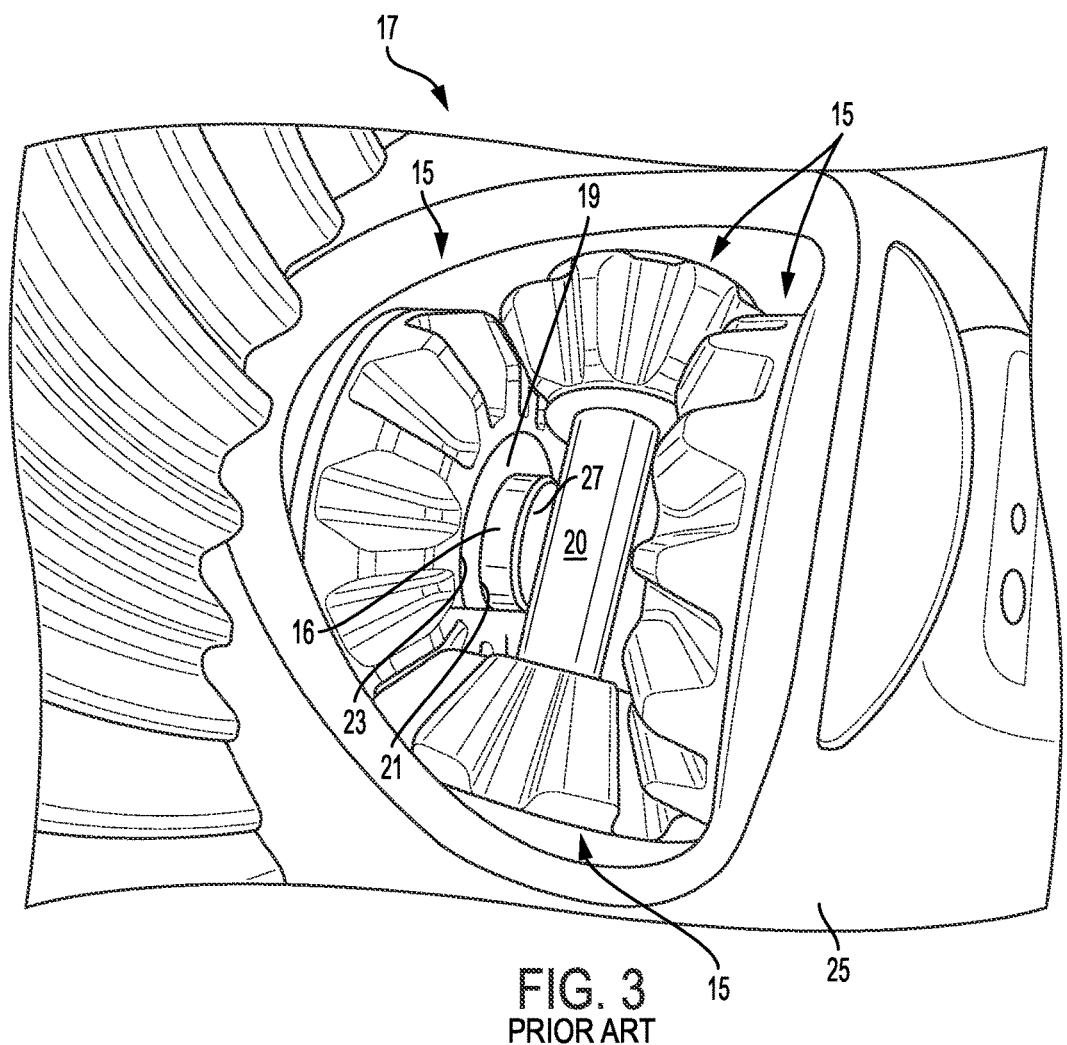
FIG. 3 is a partial perspective view of the prior art axle shaft and differential shown in FIG. 2, including a cross shaft of the differential.
Figure 5:
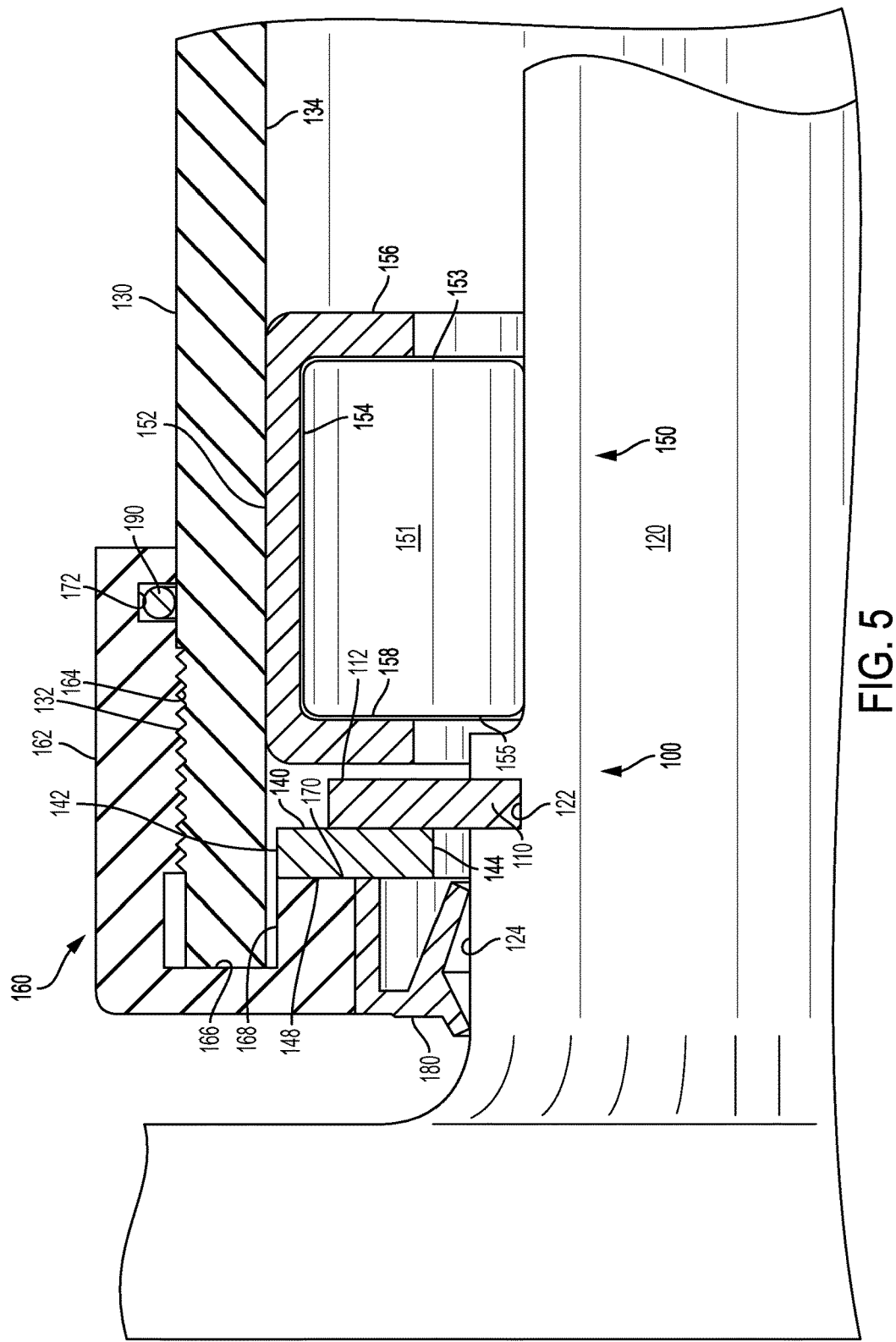
FIG. 5 is a partial cross-sectional view of a wheel end section of a solid axle assembly including an axial thrust assembly in accordance with an embodiment of the present invention.
Figure 6:
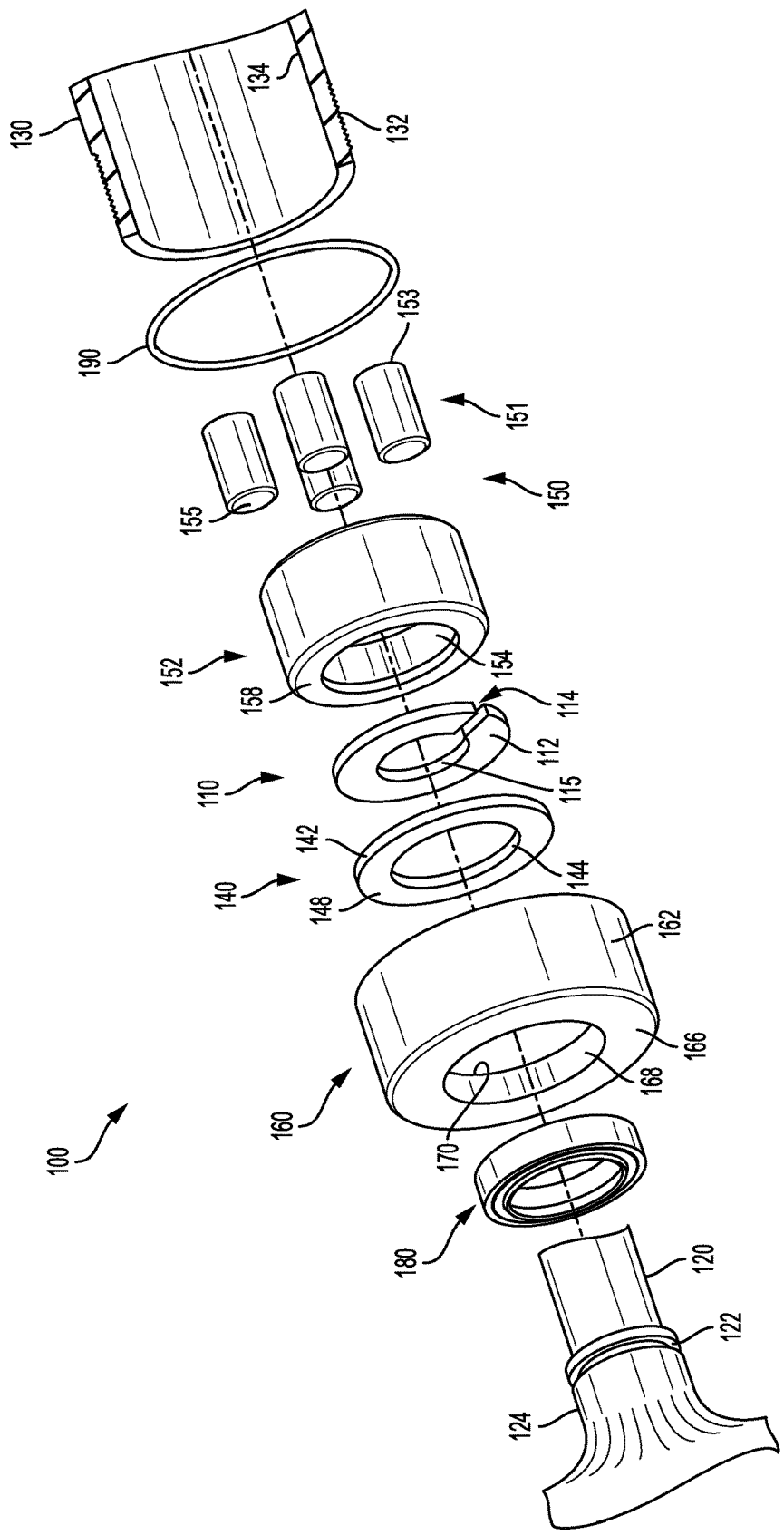
FIG. 6 is an exploded perspective view of the axial thrust assembly shown in FIG. 5.

Referring now to FIGS. 5 and 6, a wheel end axial thrust assembly 100 for use with a solid vehicle axle in accordance with an embodiment of the present disclosure includes a radial bearing assembly 150, a snap ring 110, a thrust washer 140, and a retaining nut 160 disposed on the wheel end of an axle shaft 120 and corresponding axle tube 130, as discussed in greater detail below. Axial thrust assembly 100 handles axial thrust forces that act on axle shaft 120 in the outward direction, thereby obviating the need to utilize C-locks 18 (FIGS. 2 and 3) that are typically found on existing solid axle assemblies.

As noted above, radial bearing 150 includes an outer cup 152 that defines a cylindrical outer race 154 for needle rollers 151. A first annular flange 156 and second annular flange 158 extend radially-inwardly from opposite ends of outer race 154. Outer cup 152 is preferably a machined and ground component made from a carburized grade of steel to enhance control of the press-fit, bearing clearances, and increase allowable hoop stresses. As best seen in FIG. 5, outer cup 150 is received in a bore 134 of axle tube 130. Although radial bearing assembly 150 does not handle either inward or outward axial thrust forces that act on axle shaft 120, outer cup 152 is press-fit into bore 134 to maintain the desired position within axle tube 130. As well, outer cup 130 is positioned within bore 134 of axle tube 130 so that an inner race for the plurality of rollers 151 is formed by a narrowed portion of axle shaft 120, as discussed in greater detail below.

Each needle roller 151 includes a cylindrical rolling surface extending between a first end face 153 and a second end face 155. Each first and second end face 153 and 155 is transverse to a longitudinal center axis of the corresponding needle roller 151. As such, when needle rollers 151 are disposed between outer cup 152 and the outer surface of axle shaft 120, first end faces 153 and second end faces 155 are parallel to first annular flange 156 and second annular flange 158 of outer cup 152.

Snap ring 110 is annular in shape and defines a central bore 115 that is received in an annular groove 122 on axle shaft 120. Annular groove 122, and therefore snap ring 110, is disposed outboard of radial bearing assembly 150 on an enlarged end portion 124 of axle shaft 120. The diameter of enlarged end portion 124 of axle shaft 120 is greater than the diameter of the inboard portion that forms the remainder of axle shaft 120. The increased diameter helps to minimize any additional stresses due to the formation of annular groove 122 to receive snap ring 110 and its resistance to outwardly directly axial thrust forces that act on axle shaft 120. A split 114 in snap ring 110 allows it to be slid over the transition between axle shaft 120 and its enlarged end portion 124.

A thrust washer 140 is preferably disposed outboard of, and adjacent to, an end face 112 of snap ring 110. An outermost edge 142 and innermost edge 144 of thrust washer 140 are smaller than the inside diameter of axle tube 130 and larger than the outside diameter of the axle shaft's enlarged end portion 124, respectively, so that thrust washer 140 is free to rotate about axle shaft 120. Thrust washer 140 helps to reduce friction, and therefore drag, between snap ring 110 and retaining nut 160. Note, however, in alternate embodiments, thrust washer 140 is not required.

Retaining nut 160 is threadedly received on the wheel end of axle tube 130. Retaining nut 160 includes a cylindrical body 162 with an open end defining a threaded bore 164, a radial flange 166 depending inwardly from the end of cylindrical body 160 opposite its open end, and an axial flange 168 depending inwardly from the inner perimeter of radial flange 166. As best seen in FIG. 5, axial flange 168 is concentric with cylindrical body 162, thereby defining an annular recess in which the outermost end of axle tube 130 is received as retaining nut 160 is threaded thereon. An annular end face 170 of the retaining nut's axial flange 168 serves as an abutment surface that comes into contact with an end face 148 of thrust washer 140 when outward axial thrust forces act on axle shaft 120. As best seen in FIG. 5, an annular groove 172 is defined by the inside surface of the retaining nut's cylindrical body 162, adjacent its open end. An O-ring 190 is received in annular groove 172 and forms a seal with the outer surface of axle tube 160 to help retain lubricating fluids therein. Additionally, an oil seal 180 is press-fit in a bore defined by axial flange 168 of retaining nut 160 to help retain lubricating fluids in axle tube 130.

As best seen in FIG. 5, during vehicle operations, axial thrust forces acting on axle shaft 120 in the outward direction are transferred to retaining nut 160 by way of snap ring 110. Specifically, snap ring 110 moves outwardly with axle shaft 120 as it is received in annular groove 122 thereof. The outboard end face 112 of snap ring 110 abuts thrust washer 140, which causes outboard end face 148 of thrust washer 140 to abut end face 170 of the retaining nut's axial flange 168, thereby transferring the axial thrust force thereto. In turn, retaining nut 160 transfers the outwardly directed axial thrust force to axle tube 130 by way of the threaded connection therebetween.

Figure 4:
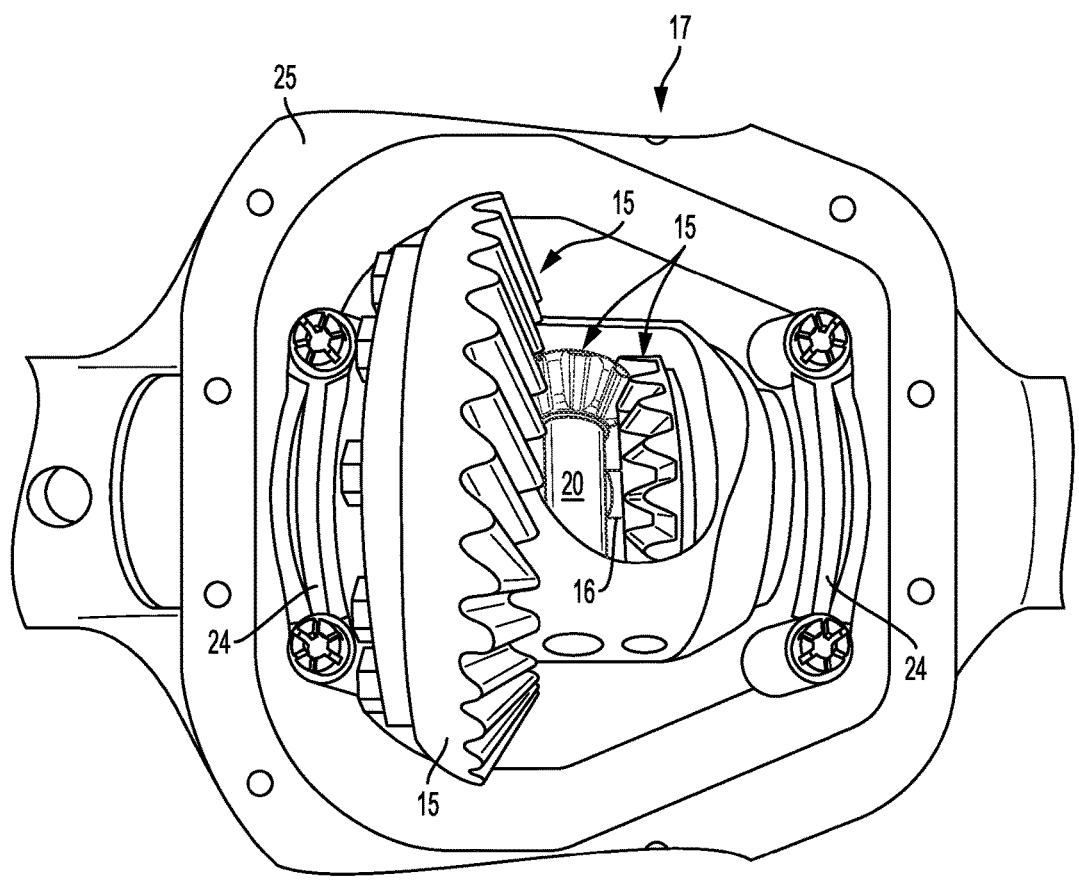
FIG. 4 is a cut away side view of the prior art axle shaft and differential shown in FIG. 2.

As previously discussed, inwardly directed axial thrust forces acting on axle shaft 150 are transferred from the innermost end of axle shaft 120 to a cross shaft 20 (FIGS. 3 and 4) of the axle's differential.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

What is claimed:

1. An axle assembly of vehicle, comprising: a differential assembly; a first axle tube extending outwardly from a first side of the differential assembly, the first axle tube including a proximal end adjacent the differential assembly, an opposite distal end, and an axle bore extending therebetween; a first axle shaft rotatably received in the first axle tube, the first axle shaft including a proximal end disposed in the differential assembly, an opposite distal end extending outwardly from the distal end of the first axle shaft, and an annular groove extending radially inwardly from an outer surface of the first axle shaft;
a retaining nut axially fixed to the distal end of the first axle tube; and a snap ring received in the annular groove of the first axle shaft,
wherein the snap ring bears against the retaining nut, thereby preventing outward motion of the first axle shaft with respect to the first axle tube.

2. The axle assembly of claim 1, further comprising a thrust washer disposed in the axle bore of the first axle tube between the snap ring and the retaining nut.

3. The axle assembly of claim 2, wherein the retaining nut further comprises an annular flange extending axially inwardly into the axle bore, and the thrust washer is adjacent an end face of the annular flange.

4. The axle assembly of claim 1, further comprising a radial bearing assembly including an outer race and a plurality of roller elements rotatably received therein, the radial bearing assembly being axially fixed within the axle bore of the first axle tube.

5. The axle assembly of claim 4, wherein the plurality of roller elements is a plurality of needle rollers.

6. The axle assembly of claim 1, wherein the retaining nut is threadedly engaged to the distal end of the first axle tube.

7. The axle assembly of claim 1, wherein the retaining nut further comprises:

a cylindrical body portion disposed on an outer surface of the distal end of the first axle tube; an annular flange depending radially inwardly from an end of the cylindrical body portion; and an annular flange that is concentric with the cylindrical body portion and depends axially inwardly from an inner perimeter of the radially extending annular flange, wherein the distal end of the axle tube is received between the cylindrical body portion and the axially extending annular flange of the retaining nut.

8. An axial thrust assembly of an axle assembly having an axle tube and an axle shaft rotatably received therein, comprising:

a retaining nut axially fixed to a first end of the axle tube, the retaining nut including an annular flange extending axially inwardly into the axle bore; a snap ring received in an annular groove defined in an outer surface of the axle shaft, and a radial bearing assembly including an outer race and a plurality of roller elements rotatably received therein, the radial bearing assembly being axially fixed within the axle bore of the axle tube, wherein the snap ring bears against the retaining nut, thereby preventing outward motion of the axle shaft with respect to the axle tube.

9. The axle assembly of claim 8, further comprising a thrust washer disposed in the axle bore of the axle tube between the snap ring and the retaining nut, wherein the thrust washer is adjacent an end face of the annular flange.

\* \* \* \* \*